US008457673B2

(12) United States Patent
Thomas et al.

(10) Patent No.: US 8,457,673 B2
(45) Date of Patent: Jun. 4, 2013

(54) METHOD AND APPARATUS FOR RADIO FREQUENCY FINGERPRINT DISTRIBUTION

(75) Inventors: Howard J. Thomas, Cirencester (GB); Luis Lopes, Swindon (GB)

(73) Assignee: Motorola Mobility LLC, Libertyville, IL (US)

( * ) Notice: Subject to any disclaimer, the term of this patent is extended or adjusted under 35 U.S.C. 154(b) by 375 days.

(21) Appl. No.: 12/901,594

(22) Filed: Oct. 11, 2010

(65) Prior Publication Data
US 2012/0088532 A1    Apr. 12, 2012

(51) Int. Cl.
*H04W 84/08*    (2009.01)
(52) U.S. Cl.
USPC ........ 455/509; 455/500; 455/513; 455/456.2; 726/2; 726/4
(58) Field of Classification Search
USPC .............. 455/500, 513, 456.1, 509, 442, 436, 455/411, 420, 67.11, 552.1, 565, 115.1, 115.3, 455/456.3, 414.2, 405, 426.1, 418, 408, 551, 455/457, 456.2; 370/328, 351, 252; 713/171, 713/168; 725/22, 13, 10, 20; 726/2, 4
See application file for complete search history.

(56) References Cited

U.S. PATENT DOCUMENTS

| | | | | |
|---|---|---|---|---|
| 8,095,170 | B2 * | 1/2012 | Lopes | 455/522 |
| 8,213,907 | B2 * | 7/2012 | Etchegoyen | 455/411 |
| 2002/0075844 | A1 * | 6/2002 | Hagen | 370/351 |
| 2003/0064735 | A1 * | 4/2003 | Spain et al. | 455/456 |
| 2004/0063425 | A1 * | 4/2004 | Wakutsu et al. | 455/418 |
| 2005/0037776 | A1 * | 2/2005 | Perez-Breva et al. | 455/456.1 |
| 2005/0208952 | A1 * | 9/2005 | Dietrich et al. | 455/456.1 |
| 2007/0026870 | A1 * | 2/2007 | Spain et al. | 455/456.1 |
| 2007/0136589 | A1 * | 6/2007 | Magdi | 713/171 |
| 2007/0287428 | A1 * | 12/2007 | Diacakis et al. | 455/414.1 |
| 2009/0097436 | A1 * | 4/2009 | Vasudevan et al. | 370/328 |
| 2009/0170532 | A1 * | 7/2009 | Lee et al. | 455/456.3 |
| 2012/0192252 | A1 * | 7/2012 | Kuo et al. | 726/4 |
| 2012/0202458 | A1 * | 8/2012 | Speicher | 455/408 |

* cited by examiner

Primary Examiner — Tan Trinh

(57) ABSTRACT

A method and apparatus for radio frequency (RF) fingerprint distribution is provided herein. In particular, when a mobile node wishes to access a restricted-access base station, the mobile node will access a database containing RF fingerprint identification information for the RF environment surrounding the restricted-access base station. When the RF environment matches the RF fingerprint, the mobile node will know that it can access the restricted-access base station.

15 Claims, 3 Drawing Sheets

FIG. 1

METHOD AND APPARATUS FOR RADIO FREQUENCY FINGERPRINT DISTRIBUTION

FIELD OF THE INVENTION

The present invention relates generally to communication systems and in particular, to a method and apparatus for radio frequency fingerprint distribution.

BACKGROUND OF THE INVENTION

Restricted access base stations are becoming more common within today's communication system environment. Such base stations restrict their access to particular mobile nodes, and do not necessarily broadcast base station identification information that may be easily obtained. For example, typical base station sites broadcast base station identification information that can be easily obtained without the need to physically decode transmissions from the base station. Each base station may additionally supply neighbor-base station information to the mobile node. Thus, a mobile node can easily obtain a list of base station sites that are within the area.

However, a restricted access base station typically does not broadcast base station identification information that can be easily obtained. Additionally, the base station may not be provided on any neighbor list. Because of this, mobile nodes wishing to access the restricted-access base station will have to do an exhaustive search of the area by physically decoding transmissions from each base station. This process is time consuming, and wastes battery resources. Therefore a need exists for a method and apparatus for locating a restricted access base station that alleviates the above problems.

Figure 2:
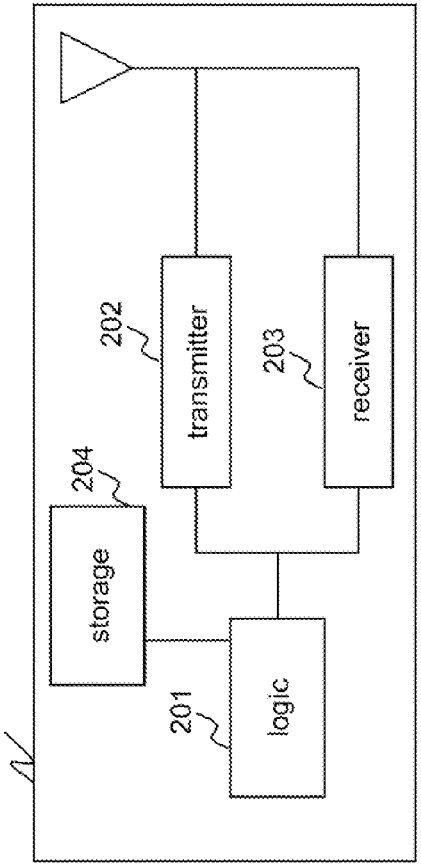
FIG. 2. is a block diagram of a base station within the communication system environment of FIG. 1.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for radio frequency (RF) fingerprint distribution is provided herein.

In particular, when a mobile node wishes to access a restricted-access base station, the mobile node will access a database containing RF fingerprint identification information for the RF environment surrounding the restricted-access base station. When the RF environment matches the RF fingerprint, the mobile node will know that it can access the restricted-access base station.

Because a mobile node will know when it is in the vicinity of a restricted-access base station without the need to physically decode transmissions from the base station, the mobile node can quickly gain access to the base station without having to do an exhaustive search of the area by physically decoding transmissions from the base station. This will greatly improve battery consumption and access times to the restricted-access base station.

The present invention encompasses a method for radio-frequency (RF) fingerprint distribution. The method comprising the steps of receiving RF fingerprint information regarding a particular base station, storing the RF fingerprint information regarding the particular base station, and receiving a request from a mobile node for RF fingerprint information regarding the particular base station. The mobile node is then provided the RF fingerprint information for the particular base station based on the request.

The present invention additionally encompasses a method for radio-frequency (RF) fingerprint distribution. The method comprises the steps of determining a base station identification for a nearby base station, determining RF fingerprint information for the environment nearby the base station, and sharing the RF fingerprint information with other mobile nodes so that the other nodes can better locate the base station.

The present invention additionally encompasses a mobile node for radio-frequency (RF) fingerprint distribution. The mobile node comprises logic circuitry determining a base station identification for a nearby base station and determining RF fingerprint information for the environment nearby the base station. The mobile node additionally comprises transmission circuitry sharing the RF fingerprint information with other mobile nodes so that the other nodes can better locate the base station.

Figure 1:
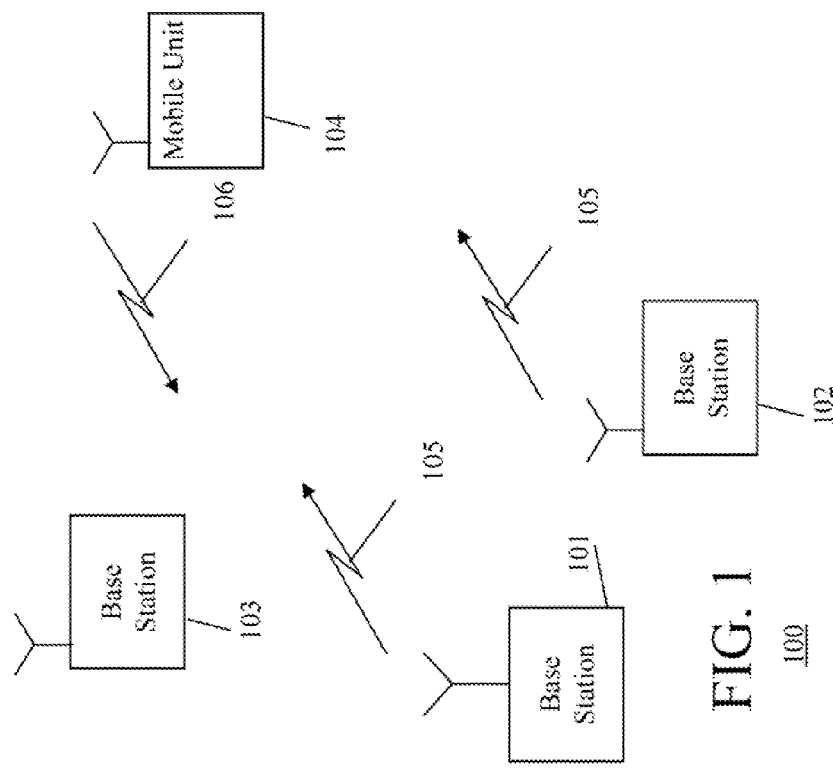
FIG. 1. is a block diagram of a communication system environment.

Turning now to the drawings, wherein like numerals designate like components, FIG. 1 is a block diagram of communication system environment 100 in accordance with the preferred embodiment of the present invention. In the preferred embodiment of the present invention, communication system environment 100 is preferably a cellular communication system environment that may incorporate any number of base stations 101-103 utilizing any number of communication system protocols. For example, communication system environment 100 may comprise base stations utilizing protocols as described in any of the next-generation communication system protocols (e.g., UMTS, LTE, WiMAX, 3GPP, . . . , etc.). As shown, base stations 101-102 are continuously transmitting downlink signals 105 such as a physical cell identification (PCID) signal. Such signals provide base station identification information without the need for decoding. For simplicity, only three base stations 101-103 and one mobile node 104 are shown in FIG. 1, however, one of ordinary skill in the art will recognize that communication system environment 100 may, and typically does comprise many base stations in communication with many mobile nodes.

As discussed above, restricted access base stations (e.g., base station 103) are becoming more common within today's communication system environment. Such base stations typically do not broadcast base station identification information 105 that can be easily obtained. For example, they may broadcast a particular scrambling code which is easily obtained by a mobile node 104, but this code is not unique even within a small area, and cannot be used to identify the base station 103. Additionally, base stations 101 and 102 may not have provided a neighbor list that contains base station 103. Because of this, mobile node 104 wishing to access restricted-access base station 103 will have to do an exhaustive search of the area by physically decoding transmissions from each base station in the area to determine if base station 103 is present. This process is time consuming, and wastes battery resources.

In order to alleviate the above-mentioned need, mobile node 104 will be provided RF fingerprint identification information for base station 103. When the RF environment sensed by mobile node 104 matches the RF fingerprint, mobile node 104 will know that it is near restricted-access base station 103 without having to physically decode transmissions from base station 103. Access to base station 103 can then take place.

Conversely, when the RF environment sensed by mobile node 104 does not match the RF fingerprint, mobile node 104 may save battery power by ignoring any received base station transmissions that might come from base station 103 (e.g. if they happen to include the same easily decodable characteristic such as the same scrambling code).

There are several embodiments envisioned for providing mobile node 104 with RF fingerprint information. In a preferred embodiment, RF fingerprint information is supplied to infrastructure equipment (e.g., a base station) by various mobile nodes. Nodes that have access to a base station can, for example, take an RF fingerprint of the area and provide the fingerprint to network infrastructure. This information is stored in a central database (not shown in FIG. 1), and provided to mobile nodes upon request.

A mobile node may know beforehand what restricted-access base station(s) they can access. The mobile nodes just don't know when they're in the particular base station's coverage area. The mobile node can provide base station identification information to a base station (via uplink transmission 106), and then obtain RF fingerprint information surrounding the particular base station. When the RF environment matches the RF fingerprint, the mobile node will know that it can access the restricted-access base station.

Alternatively, the mobile node can obtain an RF fingerprint for a particular base station, and store that information in an internal database (not shown in FIG. 1). Then the Mobile can tell that he's been there before. That allows the mobile node to remember what base stations are in the area of any particular RF fingerprint. When the RF environment matches an RF fingerprint, the mobile node will know what restricted-access base stations it can access.

RF Fingerprinting:

It should be noted that there exists many techniques for obtaining an RF fingerprint of a base station. The particular technique for doing so is irrelevant to the above-described technique for accessing restricted-access base stations. Several of the more-common RF fingerprint information are described below:

Profiling of the average signal strength:
    The radio signal in the mobile radio environment is subject to two superimposed fading effects these are the so called Rayleigh fading, which results in large variation in signal power over a few wavelengths, and shadow fading, which produces variation in the average signal strength over several meters. The signal variation caused by Rayleigh fading is too rapid and unrepeatable to be of use in an RF fingerprint. However, shadow fading forms more repeatable patterns that can be associated with particular locations especially when signals from multiple base stations are considered. Random variations still exist so an allowed variation may be specified in addition to the pattern of average signal strengths. Thus, a set of the signal strengths of one or more base stations in the vicinity of the restricted-access base station could serve as an RF fingerprint.

Profiling of the identities of the observed base stations:
    The identity of a base station is a less variable characteristic of a base station than its signal strength so an RF profile may be associated with a set of base station identities. As a mobile moves through a network the set of base stations that is visible changes. Thus, the identities of base stations in the proximity of the restricted-access base station could serve as an RF fingerprint.

Measurement of the timing offsets from the serving base station:
    This provides a gross estimate of the distance from the serving base station that may help distinguish one RF fingerprint from another. Thus, part of the RF fingerprint may include a timing offset from the serving base station so that the mobile node may know when it is in the vicinity of the restricted-access base station.

Patterns of change:
    The potential physical entry points in to the coverage of a base station may be constrained by the geometry of buildings, terrain features, road layouts etc. Consequently, there may be a limited number of trajectories that a mobile may follow to access a particular base station. Therefore, patterns of change in signal strength and base station identities may be associated with particular trajectories and hence indicate a likelihood that a mobile node is approaching a particular base station.

Velocity estimate:
    Typically, a base station that may be accessed but is not included in the neighbour list is excluded because it is not explicitly managed by the network but is deployed ad-hoc to service a very small coverage area such as a home or an office. Consequently, there is not much point attempting to access the base station unless the mobile is moving slowly.

A unique identity of a particular base station that is not included in a neighbor base station list:
    The identification of the restricted-access base station should be provided as part of the RF fingerprint information.

The above may be used in isolation or combination to provide an RF fingerprint that can indicate to the mobile node that it is in the vicinity of a home type base station and as such start trying to take measurements of that base station.

FIG. 2. is a block diagram of a base station within the communication system environment of FIG. 1. As shown, base stations 101-103 comprises logic circuitry 201, transmit circuitry 202, receive circuitry 203, and storage (database) 204. Storage/database 204 serves to store RF fingerprint information for various base stations (e.g., restricted-access base stations). Logic circuitry 201 preferably comprises a microprocessor controller, such as, but not limited to a Freescale PowerPC microprocessor. In the preferred embodiment of the present invention logic circuitry 201 serves as means for controlling base stations 101-103, and as means for analyzing received message content, and means for providing the RF fingerprint information to the requesting mobile node. Transmit and receive circuitry 202-203 are common circuitry known in the art for communication utilizing well known network protocols, and serve as means for transmitting and receiving messages. For example, transmitter 202 and receiver 203 could be well known IEEE 802.16 transmitters and receivers that utilize the IEEE 802.16 network protocol. Other possible transmitters and receivers include, but are not limited to transceivers utilizing Bluetooth, IEEE 802.11, or HyperLAN protocols. Finally, storage 204 comprises standard random access memory and is utilized for storing RF fingerprint information for various base stations.

Figure 3:
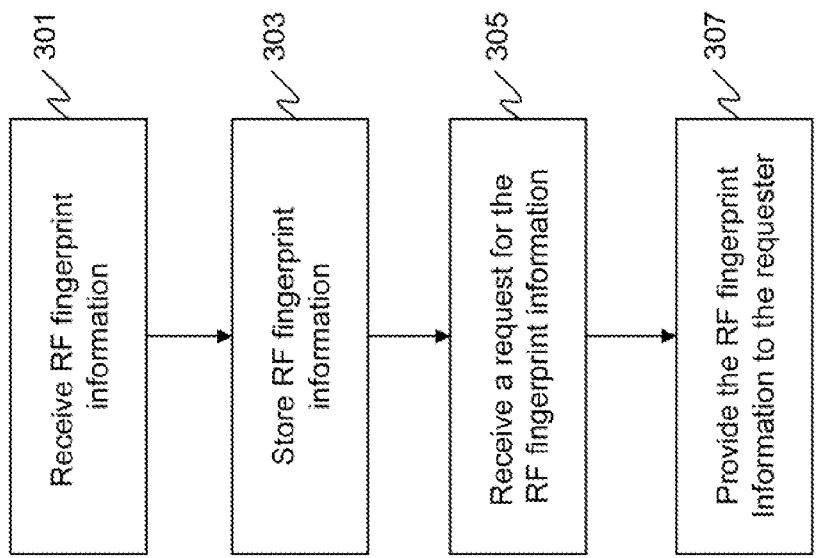
FIG. 3 is a flow chart showing operation of base stations 101-103 of FIG. 2.

FIG. 3 is a flow chart showing operation of base stations 101-103 of FIG. 2. The logic flow begins at step 301 where receiver 203 receives RF fingerprint information regarding a particular base station site (e.g., a restricted-access base station). As discussed, this information is received via uplink communication signal 106 transmitted by a mobile node (which may or may not be mobile node 104). At step 303 the RF fingerprint information is accessed by logic circuitry 201 and stored in storage 204 (internal database). At a later time, a request is received by receiver 203 from mobile node 104 for the RF fingerprint information (step 305). In response, at step 307 logic circuitry 201 accesses database 204 and obtains the information and instructs transmitter 202 to provide (transmit) the information to the requesting mobile node via downlink transmission 105.

It should be noted that in an alternate embodiment FR fingerprint information may be obtained for a particular cell from multiple mobile nodes. In this situation, multiple estimates of the RF fingerprint from one or more mobile nodes may be stored by logic circuitry 201. A best-fit RF fingerprint can be calculated by logic circuitry 201 from the estimates. The step of providing the mobile node the RF fingerprint information then would comprise providing the best-fit RF fingerprint to the mobile node.

Figure 4:
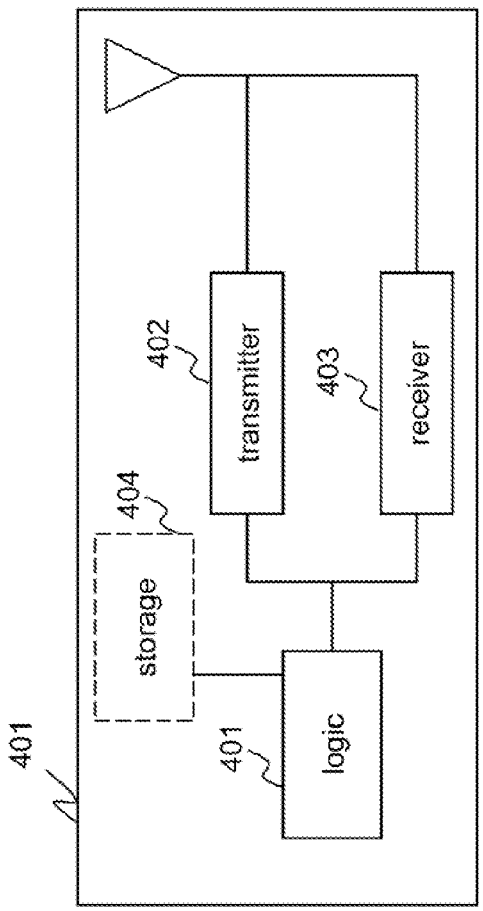
FIG. 4. is a block diagram of a mobile node of FIG. 1.

FIG. 4. is a block diagram of a mobile node 104 of FIG. 1. As shown, node 104 comprises logic circuitry 401, transmit circuitry 402, receive circuitry 403, and optional storage (database) 404. Storage 404 serves to store RF fingerprint information for various base stations (e.g., restricted-access base stations). Logic circuitry 401 preferably comprises a microprocessor controller, such as, but not limited to a Freescale PowerPC microprocessor. In the preferred embodiment of the present invention logic circuitry 401 serves as means for controlling base stations 101-103, and as means for analyzing received message content, and means for providing the RF fingerprint information to the requesting mobile node. Transmit and receive circuitry 402-403 are common circuitry known in the art for communication utilizing a well known network protocols, and serve as means for transmitting and receiving messages. For example, transmitter 402 and receiver 403 could be well known IEEE 802.16 transmitters and receivers that utilize the IEEE 802.16 network protocol. Other possible transmitters and receivers include, but are not limited to transceivers utilizing Bluetooth, IEEE 802.11, or HyperLAN protocols. Finally, storage 404 comprises standard random access memory and is utilized for storing RF fingerprint information for various base stations.

Figure 5:
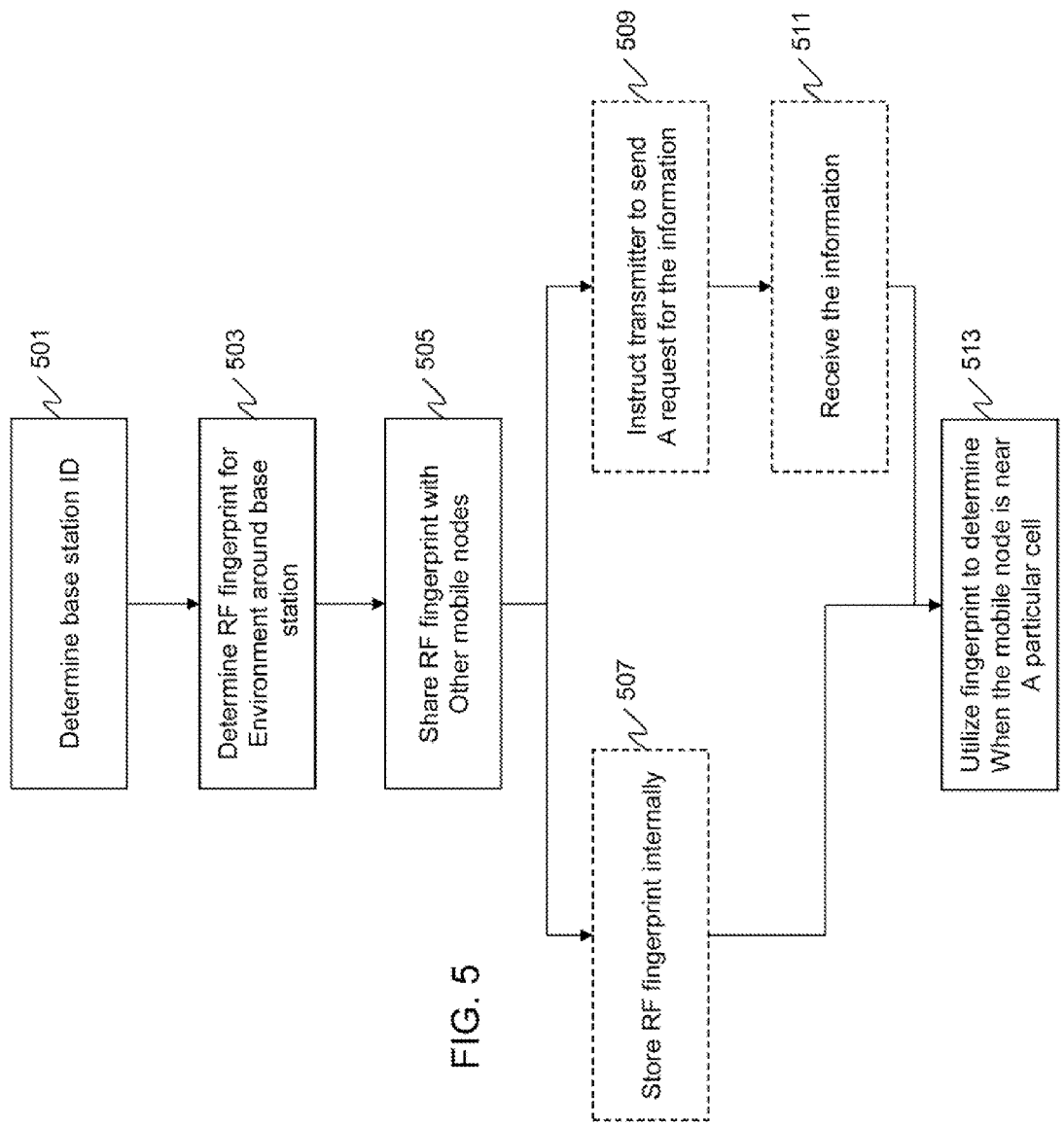
FIG. 5 is a flow chart showing operation of the mobile node of FIG. 3.

FIG. 5 is a flow chart showing operation of the mobile node of FIG. 3 For this embodiment, RF fingerprint information is obtained for a particular base station and then provided to infrastructure equipment. The RF fingerprint information can then be later retrieved from the infrastructure equipment, or alternatively stored for local retrieval. It should be noted, however, that the RF fingerprint information sent to the base station is provided to the other nodes that request the information.

The logic flow begins at step 501 where a nearby base station (e.g., restricted-access base station 103) identification is determined by logic circuitry 401. At step 503 logic circuitry 401 determines RF fingerprint information for the environment nearby the base station. The RF fingerprint information is then shared with other mobile nodes so that the other nodes can better locate the base station (step 505).

In one embodiment, the RF fingerprint information is provided by transmission circuitry 402 to a base station so that the base station can provide the RF fingerprint information to the other nodes that requests the information. In another embodiment, the step of sharing the information with the other mobile nodes comprises the step of sharing the information by providing the information directly to the other mobile nodes (e.g., via data exchange such as WiFi, Bluetooth, Wide-Area Networks, Local Area Networks, . . . , etc.).

In optional step 507, the RF fingerprint information is stored internally within database 404, and later retrieved for use. If not stored internally, then when the information is needed, logic circuitry 401 instructs transmitter 402 to send a request for the information to infrastructure equipment (step 509). In response, receiver 403 receives the information (step 511).

Regardless of how the RF fingerprint information is received, logic circuitry 401 will utilize the information to determine when it is near a particular base station (step 513). In particular, logic circuitry will instruct receiver 403 to obtain a fingerprint of the surrounding RF environment. When logic circuitry 401 determines that the RF environment matches the RF fingerprint, the mobile node will know that it is near the particular base station, and can access the access the base station.

It should be noted that in an alternate embodiment multiple estimates of the FR fingerprint information may be obtained for a particular cell by the mobile node. In this situation, a best-fit RF fingerprint can be calculated by logic circuitry 401 from the estimates. The best-fit RF fingerprint can then be utilized in steps 505-513.

While the invention has been particularly shown and described with reference to a particular embodiment, it will be understood by those skilled in the art that various changes in form and details may be made therein without departing from the spirit and scope of the invention. For example, as discussed above, there exist many techniques for obtaining an RF fingerprint of a communication system environment. The particular technique for doing so is irrelevant to the above-described technique for accessing restricted-access base stations. Further, the characteristics used in the fingerprint could be derived from base stations using a different radio technology from the restricted base station, or generally to a set of base stations using multiple radio technologies. Additionally, although the above description has the mobile node providing the RF fingerprint to infrastructure equipment (e.g., a base station), there could also be mobile to mobile distribution of the RF fingerprint, perhaps by Bluetooth, infrared, or near-field communication technologies. It is intended that such changes come within the scope of the following claims:

The invention claimed is:

1. A method for radio-frequency (RF) fingerprint distribution, the method comprising the steps of:
   receiving a request from a mobile node for RF fingerprint information regarding the particular base station;
   providing the mobile node the RF fingerprint information for the particular base station based on the request;

receiving by a base station, from a mobile station, RF fingerprint information regarding a particular base station;

storing, by the base station, the RF fingerprint information regarding the particular base station;

storing multiple estimates of the RF fingerprint from one or more mobile nodes; and calculating a best-fit RF fingerprint from the estimates;

wherein the step of providing the mobile node the RF fingerprint information comprises the step of providing the best-fit RF fingerprint to the mobile node.

2. The method of claim 1 wherein the step of storing the RF fingerprint information comprises the step of storing the RF fingerprint information within an internal database.

3. The method of claim 1 wherein the RF fingerprint information comprises at least one of the following: a set of the signal strengths of one or more base stations, a set of identities of at least one base station in a proximity to the particular base station, and a timing offset from the base station that exists in the proximity of the particular base station.

4. The method of claim 1 wherein the step of receiving the request comprises the step of receiving the request via an uplink communication signal transmitted by the mobile node.

5. A method for radio-frequency (RF) fingerprint distribution, the method comprising the steps of:

determining by a mobile node, a base station identification for a nearby base station;

determining by the mobile node, RF fingerprint information for the environment nearby the base station;

sharing by the mobile node, the RF fingerprint information with other mobile nodes so that the other nodes can better locate the base station;

storing multiple estimates of the RF fingerprint; and calculating a best-fit RF fingerprint from the estimates;

wherein the step of sharing comprises the step of sharing the best-fit RF fingerprint with the other mobile nodes.

6. The method of claim 5 wherein the step of sharing the information with the other mobile nodes comprises the step of sharing the information by providing the information to a base station so that the base station can provide the information to the other mobile nodes.

7. The method of claim 6 wherein the step of sharing the information with the other mobile nodes comprises the step of sharing the information by providing the information directly to the other mobile nodes.

8. The method of claim 5 wherein the RF fingerprint information comprises at least one of the following: a set of the signal strengths of one or more base stations, a set of identities of at least one base station in a proximity to the particular base station, and a timing offset from the base station that exists in the proximity of the particular base station.

9. The method of claim 5 further comprising the step of storing the RF fingerprint information within an internal database.

10. The method of claim 5 further comprising the steps of:

sending a request to a base station for the RF fingerprint information; and receiving the RF fingerprint information in response to the request.

11. A mobile node for radio-frequency (RF) fingerprint distribution, the mobile node comprising:

logic circuitry determining a base station identification for a nearby base station and determining RF fingerprint information for the environment nearby the base station;

transmission circuitry sharing the RF fingerprint information with other mobile nodes so that the other nodes can better locate the base station; and a database storing multiple estimates of the RF fingerprint;

wherein the logic circuitry calculates a best-fit RF fingerprint from the estimates; and wherein the transmission circuitry shares the best-fit RF fingerprint with the other mobile nodes.

12. The mobile node of claim 11 wherein the transmission circuitry shares the information with the other mobile nodes by providing the information to a base station so that the base station can provide the information to the other nodes that request the information.

13. The mobile node of claim 11 wherein the transmission circuitry shares the information with the other mobile nodes by providing the information directly to the other mobile nodes.

14. The mobile node of claim 11 wherein the RF fingerprint information comprises at least one of the following: a set of the signal strengths of one or more base stations, a set of identities of at least one base station in a proximity to the particular base station, and a timing offset from the base station that exists in the proximity of the particular base station.

15. The mobile node of claim 11 further comprising an internal database storing the RF fingerprint.

* * * * *